United States Patent [19]

Cuzin et al.

[11] Patent Number: 4,864,014
[45] Date of Patent: Sep. 5, 1989

[54] POLYESTER AMIDES AND POLYETHER THIOETHER ESTER AMIDES AND PROCESS FOR PREPARING THEM

[75] Inventors: Daniel Cuzin, Port Marly; Didier Judas, Paris, both of France

[73] Assignee: Atochem, Paris La Defense, France

[21] Appl. No.: 158,255

[22] Filed: Feb. 19, 1988

[30] Foreign Application Priority Data

Feb. 26, 1987 [FR] France ................................ 87 02568

[51] Int. Cl.$^4$ ........................ C08G 63/04; C08G 63/68
[52] U.S. Cl. ..................................... 528/279; 528/290; 525/420; 525/435
[58] Field of Search ................ 528/290, 279; 525/420, 525/435

[56] References Cited

U.S. PATENT DOCUMENTS

| | | | |
|---|---|---|---|
| 3,660,356 | 5/1972 | Radlmann et al. | 528/290 |
| 4,117,032 | 9/1978 | Kwiecinski | 528/279 |
| 4,232,167 | 11/1980 | Louthan | 528/279 |
| 4,380,622 | 4/1983 | Chiba et al. | 528/279 |
| 4,501,879 | 2/1985 | Barbee et al. | 528/288 |
| 4,536,563 | 8/1985 | Okitsu et al. | 528/279 |

FOREIGN PATENT DOCUMENTS 162524 7/1986 Japan ................................ 528/290

Primary Examiner—John Kight
Assistant Examiner—Dennis R. Daley
Attorney, Agent, or Firm—Sigalos, Levine & Montgomery

[57] ABSTRACT

Polyester amides and polyether thioether ester amides of the formula

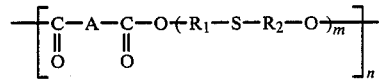

wherein
A is a polyamide sequence,
$R_1$ and $R_2$ can be the same or different and each represents a linear or branched $C_2$ to $C_{98}$ alkyl radical,
m is an integer between 1 and 50, and
n is one or greater; and the process of making such amides by reacting specific diols with a dicarboxylic polyamide having terminal acid functional groups.

13 Claims, No Drawings

POLYESTER AMIDES AND POLYETHER THIOETHER ESTER AMIDES AND PROCESS FOR PREPARING THEM

BACKGROUND OF THE INVENTION

The present invention pertains to new products: polyester amides and polyether thioether ester amides of the formula

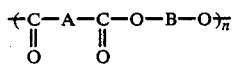

in which a designates a polyamide sequence and B is a structure containing a thio functional group.

These polyester amides and polyether thioether ester amides are prepared by reacting a dicarboxylic polyamide with a thioether glycol or a polyether thioether diol.

The presence of the thio functional group in the polymer obtained leads to a polyamide characterized by resistance to solvents contrary to the prior-art polyamides prepared by reacting a dicarboxylic polyamide with a simple hydroxylated polyoxyalkylene glycol, as described in French Patent Nos. 2,401,947 and 2,273,021. These prior-art polyamides have the disadvantage of swelling in solvents, especially if the percentage of the polyether sequences in the polymer is high.

SUMMARY OF THE INVENTION

More specifically, the products according to the present invention correspond to the general formula

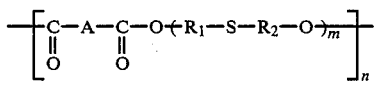

in which:

$R_1$ and $R_2$, identical or different, represent a linear or branched $C_2$ to $C_{98}$ alkyl radical, m is an integer between 1 and 50, and n is a repetition of a number of repeat units forming the macromolecule chain. The value of n is usually not lower than one and not greater than 75.

The invention also comprises the process of making such compounds as hereinafter set forth.

DETAILED DESCRIPTION

The weight percentage of the group

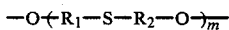

relative to the total group

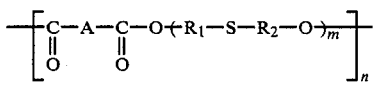

may range from 1% to 95%, preferably from 4% to 87%.

The dicarboxylic polyamide sequence

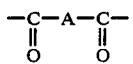

is known per se. It usually corresponds to the group

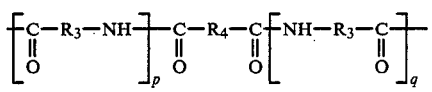

in which $R_3$ may be:
(i) a hydrocarbon chain forming a lactam and/or an amino acid in which the number of carbon atoms is preferably between 4 and 14, or
(ii) the structure

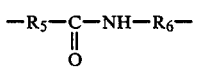

in which $R_5$ and $R_6$ represents the hydrocarbon radicals of a diacid and a diamine, respectively, $R_4$ represents the radical of the organic diacid used as a chain terminating agent. This may be, e.g., an aliphatic, a cylcoaliphatic or an aromatic group, and p and q, identical or different and one of which may be zero, represent a repetition of a number of repeat units forming the macromolecule chain of the dicarboxylic polyamide chain.

The average molecular weight of the dicarboxylic polyamide sequence is between 300 and 15,000, preferably between 600 and 5,000, p+q being between 1 an 100, preferably between 2 and 40.

In general, the polyester amides and the polyether thioether ester amides according to the present invention can also be described by the formula:

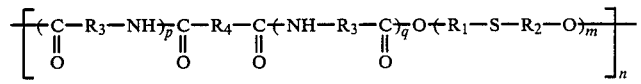

in which $R_1$, $R_2$, $R_3$, $R_4$, p, q, m and n have the same meanings as above.

The products according to the present invention are prepared by reacting a dicarboxylic polyamide whose acid functional groups are located at the chain ends; i.e., terminal acid functional groups, with a thioether glycol or a polyether thioether diol. The reaction can be schematically described as follows:

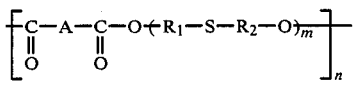

in which the symbols A, $R_1$, $R_2$, m and n have the same meanings as above.

The radical of the thioether glycol or of the polyether thioether diol, representing the group

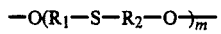

may be present in amounts ranging from 1 to 95 wt. %, preferably from 4 to 87 wt. %, in the polyamide macromolecule obtained.

The polycondensation reaction taking place between the dicarboxylic polyamide and the thioether glycol or the polyether thioether diol: which are usually used in weight percentages between 99% and 5% for between 1% and 95% of the glycol or diol and preferably between 96% and 13% for 4% to 87% of the glycol or diol, is carried out by mixing the reactants in the molten state in the presence of a catalyst. The condensation is usually carried out while stirring at a temperature between 100° C. and 350° C., preferably between 180° C. and 300° C., during a time ranging from ten minutes to 15 hours, depending on the nature and the weight of each reactant. The reaction can be carried out under practically atmospheric pressure in an inert medium or under a vacuum on the order of magnitude of 6 to 666 Pa.

So that the polycondensation reaction can take place under the most favorable conditions, it is recommended that the reactants be reacted in such amounts that an approximately stoichiometric proportion of the carboxyl groups of the polyamide to the hydroxyl groups of the thioether glycol or of the polyether thioether diol is maintained.

The catalyst recommended for preparing these polyester amides or polyether thioether ester amides are metal tetraalkoxides which correspond to the general formula $M(OQ)_4$ in which M represents titanium, zirconium or hafnium and in the same molecule, the groups Q, identical or different, designate linear or branched alkyl radicals containing 1 to 24, preferably 1 to 8, carbon atoms. $Zr(OC_2H_5)_4$, $Zr(O—iso—C_3H_7)_4$, $Zr(OC_4H_9)_4$, $Zr(OC_5H_{11})_4$, $Zr(OC_6H_{13})_4$, $Hf(OC_2H_5)_4$, $Hf(OC_4H_9)_4$, $Hf(O—iso—C_3H_7)_4$ and $Ti(OC_4H_9)_4$ can be mentioned as examples of the catalysts. The catalyst is used, alone or as a mixture, in appropriate weight percentages between ca. 0.01% and 5% of the total weight of the reaction medium.

The dicarboxylic polyamides used in the manufacture of the products according to the present invention are known per se. They are prepared according to the classical methods used to prepare such polyamides, e.g., by polycondensation of a lactam and/or an amino acid or a diacid and a diamine. These polycondensation reactions are carried out in the presence of an organic diacid whose acid functional groups are preferably attached to each end of the molecule. These diacids become attached during the polycondensation as constituents of the macromolecule chain of the polyamides and act as chain-terminating agents, which permits alpha,omega-dicarboxylic polyamides to be obtained. Depending on the excess of the organic diacid used in the polycondensation process, it is possible to regulate the length of the macromolecule chain and consequently the average molecular weight of the polyamide.

The dicarboxylic diacids used in the polyamide synthesis reaction to permit a carboxyl group to be attached to each end of the polyamide chain, playing the role of a chain-terminating agent, include alkanedioic diacids, e.g., sucinic acid, adipic acid, suberic acid, azelaic acid, sebacic acid, undecanoic acid, dodecanoic acid or cycloaliphatic or aromatic diacids, such as terephthalic acid, isophthalic acid or cyclohexanedicarboxylic acid.

The lactams and amino acids used to prepare the dicarboxylic polyamides have a hydrocarbon chain in which the number of carbon atoms is preferably between 4 and 14. They are usually selected from among butyrolactam, caprolactam, enantholactam, decalactam, undecanolactam, dodecanolactam, 6-aminohexanoic acid, 10-aminodecanoic acid, 11-aminoundecanoic acid, and 12-aminododecanoic acid.

They nylons 6—6, 6-9, 6-10 and 6-12, prepared from hexamethylene diamine and adipic acid, azelaic acid, sebacic acid and 1,12-dodecanoic acid, or nylon 9-6, prepared from nonamethylene diamine and adipic acid, can be mentioned as examples of the polyamides resulting from the polycondensation of a diacid with a diamine.

The dicarboxylic polyamides used to prepare the products according to the present invention have average molecular weights varying within a wide range. These average molecular weights are preferably between 300 and 15,000, especially between 600 and 5,000.

The polyether thioether diols used to prepare the products according to the present invention are known per se. They are prepared by polycondensation of a thioether glycol or a mixture of thioether glycols with elimination of water according to the reaction

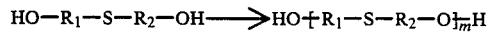

As was mentioned before, $R_1$ and $R_2$, identical or different, represent an alkyl radical containing 2 to 98 carbon atoms. Their positions as indicated in the schematic reaction formula are not imperative; it is dependent on the various modes of condensation of the thioether glycol(s). Thus, there may be head-to-head, head-to-tail, or tail-to-tail connections in the chain. Due to the higher reactivity of the hydroxyl group, thioether glycols whose sulfur atom occupies a beat position in the chain relative to the other two hydroxyl functional groups are preferably used. Thus, $R_1$ and $R_2$ can be described the structure

in which $R_7$, $R_8$, $R_9$ and $R_{10}$ can be the same or different and represent H or an alkyl radical containing 1 to 24 carbon atoms.

The condensations of thioether glycols are described, e.g., by Woodward in JOURNAL OF POLYMER SCIENCE 41, 219–223 and 225–230 (1959), as well as in U.S. Pat. No. 3,312,743. The following examples can be mentioned among the thioether glycols which can be condensed: thiodiglycol, beta-methyl thio-diglycol, beta-ethyl thiodiglycol, beta,beta'-dimethyl thiodiglycol and beta,beta'-diethyl thiodiglycol.

The thioether glycols or the polyether thioether diols used to prepare the products according to the present invention have molecular weights which can vary within a very broad range. These molecular weights may range from 122 to 6,000, preferably from 200 to 4,000.

The present invention will be further described in connection with the following nonlimiting examples which are set forth for purposes of illustration only.

In these examples, (i) the intrinsic viscosity of each polycondensate was measured in meta-cresol at 20° C., 0.5 g of product for 100 g solvent. The viscosity is stated in dl/g, (ii) the melting point of the polycondensate was determined by differential thermal analysis, and (iii) the oil resistance according to ASTM No. 3 over seven days at 121° C. was determined by measuring the changes in weight, expressed in %, or specimens immersed in oil.

EXAMPLE 1

35.36 g of dicarboxylic polyamide 12 with an average molecular weight of 2,080, prepared in advance by polycondensation of dodecanolactam in the presence of adipic acid, was charged into a 250 cm³ reactor. 13.43 g of a polyether thioether diol with an average molecular weight of 790, prepared in advance by polycondensation of a mixture of thiodiglycol and beta-methyl thiodiglycol in a molar ratio of 70/30, and 0.48 g of tetrabutyl ortho-zirconate were then added.

After the reaction medium was placed under an inert atmosphere, the temperature was raised to 200° C. The inside of the reactor was then evacuated while stirring vigorously beginning from the moment when melting of the constituents was observed. The reaction was then continued for 30 minutes at 220° C. under a pressure of 27 Pa, after which the same pressure was maintained, and the temperature of the reaction medium was progressively raised to 240° C. within 20 minutes. Heating was continued at 240° C. for one hour.

The stirring speed must be reduced in proportion to the increase in viscosity.

The polyether thioether ester amide obtained has an intrinsic viscosity of 1.12 dl/g. Its melting point is 169° C.

Its formula is:

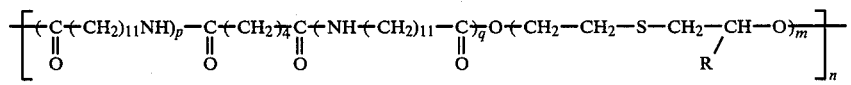

in which $p+q=9.82$, $m=5$ with $R=H$, and $m=2.14$ with $R=CH_3$.

EXAMPLE 2

According to a procedure similar to Example 1, 24.8 g of a dicarboxylic polyamide 12 obtained by the polycondensation of dodecanolactam in the presence of adipic acid, having an average molecular weight of 800, are reacted with 24.49 g of polyether thioether diol used in Example 1 in the presence of 0.25 g of tetrabutyl ortho-zirconate for 30 minutes at 220° C. under a pressure of 27 Pa; after the temperature of the reaction medium was progressively raised to 240° C.

The polyether thioether ester amide prepared under these conditions possesses the following characteristics:

(i) intrinsic viscosity=0.86 dl/g, and (ii) melting point - 144° C.

Its formula corresponds to:

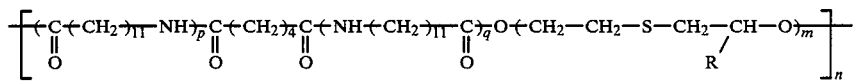

in which $P+q=3.32$, $m=5$ with $R=H$, and $m=2.14$ with $R=CH_3$, m in totality is 7.14.

EXAMPLE 3

24.96 g of dicarboxylic polyamide 12 used in Example 1 are reacted with 25.44 g of a polyether thioether diol with an average molecular weight of 2,120, which was prepared in advance by polycondensation of a mixture of thiodiglycol and beta-methyl thiodiglycol at a molar ratio of 70/30, in the presence of 0.5 g of tetrabutyl ortho-zirconate according to the procedure described in Example 1.

The reaction time at 240° C. under high vacuum is 90 minutes.

The melting point of the polymer obtained is 168° C. Its intrinsic viscosity is 0.83 dl/g.

Its formula corresponds to:

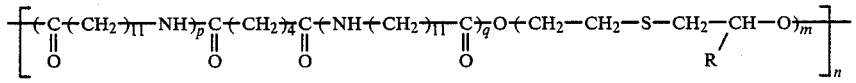

in which $p+q=9.82$, $m=13.60$ with $R=H$, and $m=5.83$ with $R=CH_3$, m in totality is 19.43.

EXAMPLE 4

18.7 g of dicarboxylic polyamide 12 prepared in advance by polycondensation of dodecanolactam in the presence of adipic acid, having an average molecular weight of 850, are reacted with 31.24 g of a polythiodiglycol having an average molecular weight of 1,420 in the presence of 0.49 g of tetrabutyl ortho-zirconate according to the procedure described in Example 1.

After 30 minutes at 220° C. under a pressure of 27 Pa, the reaction is continued for two hours at 240° C.

The intrinsic viscosity of the polycondensate obtained under these conditions is 0.93 dl/g. Its melting point is 146° C.

Its formula corresponds to:

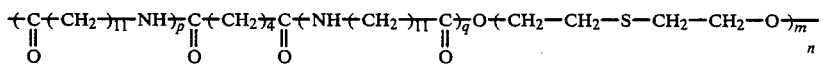

in which p+q=3.57, and m=13.48.

EXAMPLE 5

28.98 g of a dicarboxylic polyamide 12 with an average molecular weight of 2,070, prepared in advance by polycondensation of dodecanolactam in the presence of adipic acid, are reacted with 19.88 g polythiodiglycol used in Example 4 in the presence of 0.67 g of tetrabutyl ortho-zirconate.

After 30 minutes at 220° C. under a pressure of 27 Pa, the reaction is continued for 150 minutes at 240° C. The polymer thus obtained has a melting peak at 168° C. Its intrinsic viscosity is 1.14 dl/g.

Its formula corresponds to:

|  | Polyether ester amid | | Polyether thioether ester amide | | | | |
|---|---|---|---|---|---|---|---|
|  | PEEA 1 | PEEA 2 | Example 1 | Example 2 | Example 3 | Example 4 | Example 5 |
| Increase in weight % | 15 | 93 | 4.2 | 8 | 4.5 | 1.6 | 4.1 |

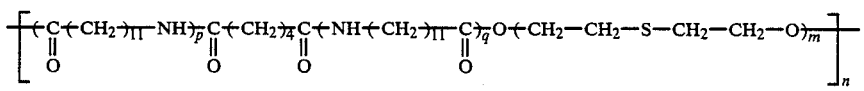

in which p+q=9.77 and m=13.48.

Resistance of the Polyether Thioether Ester Amides to Oil at 121° C. for Seven Hours according to ASTM No. 3

To evaluate this property, the various polyether thioether ester amides prepared according to the procedures described in Examples 1 through 5 were crushed, dried and molded by compression. The molding was carried out as follows:

(i) Dimension of the molded plates: 100×100×2 mm,
(ii) Mold temperature: 200° C., and
(iii) Dwell pressure and time: 10 tons for 10 minutes.

After removal from the mold and cooling of the plates, dumbbell-shaped test specimens with a length of 50 mm; five for each product, were cut off and immersed in ASTM No. 3 oil for seven days at 121° C.

For comparison, the same test was carried out with dumbbell-shaped test specimens which were molded from two polyether ester amides, PEEA 1 and PEEA 2, whose preparation is described in French Pat. No. 2,273,021 and which were cut out under the same conditions.

PEEA 1 is obtained by the polycondensation of 67 parts by weight of a dicarboxylic polyamide 12 having an average moledular weight of 2,000, which was prepared from dodecanolactam and adipic acid, with 33 parts by weight of a polyoxytetramethylene glycol with an average molecular weight of 1,000. The polyether ester amide obtained has an intrinsic viscosity of 1.67 dl/g.

PEEA 2 is prepared by the polycondensation of 30 parts by weight of a dicarboxylic polyamide 12 having an average molecular weight of 850, prepared from dodecanolactam and adipic acid, with 70 parts by weight of a polyoxytetramethylene glycol having an average molecular weight of 2,000. The polyether ester amide obtained has an intrinsic viscosity of 1.84 dl/g.

The increase in the weight of the polyether thioether ester amides according to Examples 1 through 5 and of the polyether ester amides PEEA 1 and PEEA 2 in ASTM oil No. 3 after seven days at 121° C. is shown in the table below.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. Polyester amides and polyether thioether ester amides of the formula

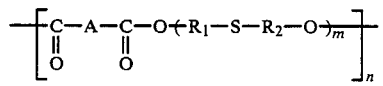

wherein
A is a polyamide sequence,
$R_1$ and $R_2$ can be the same or different and each represents a linear or branched $C_2$ to $C_{98}$ alkyl radical,
m is an integer between 1 and 50, and
n is one or greater.

2. The polyester amides and polyether thioether ester amides of claim 1, wherein $R_1$ and $R_2$ are each represented by the structure

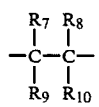

in which $R_7$, $R_8$, $R_9$ and $R_{10}$ can be the same or different and each represents H or a $C_1$ to $C_{24}$ radical.

3. The polyester amides and polyether thioether ester amides of claim 2, wherein n is a number between 1 and 75.

4. The polyester amides and polyether thioether ester amides of claim 3, wherein the weight percentage of the group

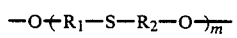

is 1% to 95% of the total formula

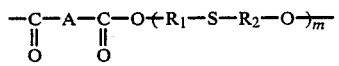

5. The polyester amides and polyether thioether ester amides of claim 4, wherein the dicarboxylic polyamide sequence

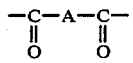

corresponds to the formula

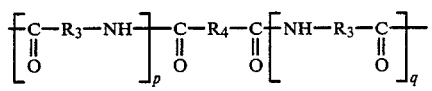

in which
R$_3$ may be selected from a hydrocarbon chain forming a lactam and/or an amino acid, or the structure

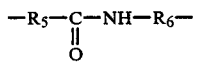

in which R$_5$ and R$_6$ represent the hydrocarbon radicals of a diacid and a diamine, respectively, R$_4$ represents the radical of an organic diacid, and p and q, which are identical or different, and one of which can be zero, represent a repetition of a number of units forming the macromolecule chain of the dicarboxylic polyamide sequence.

6. The polyester amides and polyether thioether ester amides of claim 5, wherein the hydrocarbon chain of R$_3$ contains 4 to 14 carbon atoms.

7. The polyester amides and polyether thioether ester amides of claim 6, wherein R$_4$ is an aliphatic, cycloaliphatic or aromatic group.

8. The polyester amides and polyether thioether ester amides of any one of claims 5 through 7, wherein the average molecular weight of the dicarboxylic polyamide chain is between 300 and 15,000, p+2q being between 1 and 100.

9. A process for preparing a polyester amide and polyether thioether ester amide of the formula

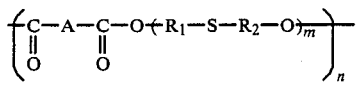

wherein
A is a polyamide sequence,
R$_1$ and R$_2$ can be the same or different and each represents a linear or branched C$_2$ to C$_{98}$ alkyl radical,
m is an integer between 1 and 50, and
n is one or greater,
comprising reacting a dicarboxylic polyamide, whose acid functional groups are located at the ends of the chain, with a diol; the diol being a thioether glycol or a polyether thioether diol of the formula:

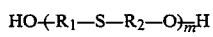

wherein:
R$_1$ and R$_2$ can be the same or different and each represents a linear or branched C$_2$ to C$_{98}$ alkyl radical, and
m is an integer between 1 and 50.

10. The process of claim 9, wherein 99 to 5 wt. % dicarboxylic polyamide is reacted with 1 to 95 wt. % thioether glycol or polyether thioether diol.

11. The process of claim 9, wherein the reactants are reacted in approximately stoichiometric ratios of the carboxyl groups of polyamide and the hydroxyl groups of thioether glycol or polyether thioether diol.

12. The process of claim 11, wherein the polycondensation is carried out with the reactants in the molten state and in the presence of a catalyst.

13. The process of any one of claims 9 through 12, wherein the catalyst has the formula M(OQ)$_4$, in which:
M is titanium, zirconium or hafnium, and
Q is a linear or branched alkyl radical containing 1 to 24 carbon atoms.

* * * * *

UNITED STATES PATENT AND TRADEMARK OFFICE
CERTIFICATE OF CORRECTION

PATENT NO. : 4,864,014
DATED : September 5, 1989
INVENTOR(S) : CUZIN, et al

It is certified that error appears in the above-identified patent and that said Letters Patent is hereby corrected as shown below:

Column 2, line 28, correct "represents" to read -- represent --;

Column 3, line 63, cancel "dicarboxylic" and substitute therefor -- carboxylic --;

Column 3, line 67, correct "sucinic" to read -- succinic --;

Column 4, line 31, correct the formula by inserting before "HO" the letter -- m --;

Column 4, line 42, correct "beat" to read -- beta --;

Column 5, line 64, , after "R = CH₃." insert -- m in totaling is 7.14 --;

Column 6, line 21, cancel "P" and substitute therefor -- p --;

Column 7, underscore lines 28, 29 and 30; and

Column 10, line 1, cancel "2".

Signed and Sealed this

Sixteenth Day of July, 1991

Attest:

HARRY F. MANBECK, JR.

*Attesting Officer*      *Commissioner of Patents and Trademarks*